United States Patent
Braun et al.

(10) Patent No.: US 12,283,702 B2
(45) Date of Patent: Apr. 22, 2025

(54) SEAL FOR A BATTERY HOUSING OF A HIGH-VOLTAGE BATTERY, METHOD, BATTERY HOUSING, HIGH-VOLTAGE BATTERY AND MOTOR VEHICLE

(71) Applicant: Bayerische Motoren Werke Aktiengesellschaft, Munich (DE)

(72) Inventors: Josef Braun, Feldkirchen-Westerham (DE); Andreas Obermaier, Munich (DE); Joern Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 716 days.

(21) Appl. No.: 17/595,202

(22) PCT Filed: Jul. 6, 2020

(86) PCT No.: PCT/EP2020/068992
§ 371 (c)(1),
(2) Date: Nov. 11, 2021

(87) PCT Pub. No.: WO2021/028118
PCT Pub. Date: Feb. 18, 2021

(65) Prior Publication Data
US 2022/0223956 A1    Jul. 14, 2022

(30) Foreign Application Priority Data
Aug. 9, 2019  (DE) .................. 10 2019 121 510.2

(51) Int. Cl.
*H01M 50/00* (2021.01)
*H01M 50/207* (2021.01)
*H01M 50/249* (2021.01)

(52) U.S. Cl.
CPC ....... *H01M 50/207* (2021.01); *H01M 50/249* (2021.01)

(58) Field of Classification Search
CPC ............. H01M 50/207; H01M 50/249; H01M 50/636; H01M 50/186; H01M 50/184;
(Continued)

(56) References Cited

U.S. PATENT DOCUMENTS

| 3,754,997 A | 8/1973 | Ralston |
| 2007/0128514 A1 | 6/2007 | Yoshida |

(Continued)

FOREIGN PATENT DOCUMENTS

| CN | 206688973 U | * 12/2017 |
| CN | 107852845 A | 3/2018 |

(Continued)

OTHER PUBLICATIONS

Nebelsiek, Method For Attaching an Inflatable Sealing Element to a Housing Part, Apr. 2018, See the Abstract. (Year: 2018).*

(Continued)

*Primary Examiner* — Anca Eoff
*Assistant Examiner* — Monique M Wills
(74) *Attorney, Agent, or Firm* — Crowell & Moring LLP (57) ABSTRACT

A seal can be moved from a production position for a production tool into an installation position for a battery housing. The seal has a seal body to be arranged between a housing flange of a lower housing part and a housing cover of the battery housing, and has positioning elements and fixing elements for positioning and fixing the seal body on the housing flange. The seal body is designed as a one-piece, frame-like sealing ring made of a resilient plastic and has a seal body portion, which is reversibly variable in length, with fold regions. The seal body portion in the folded state of the fold regions provides the production position and in (Continued)

the unfolded state of the fold regions provides the installation position. Positioning regions and fixing regions in which the positioning elements and fixing elements are arranged have a greater width than the fold regions.

15 Claims, 4 Drawing Sheets

(58) Field of Classification Search
CPC . H01M 50/183; H01M 8/2485; H01M 8/0273
See application file for complete search history.

(56) References Cited

U.S. PATENT DOCUMENTS

| | | | |
|---|---|---|---|
| 2013/0216873 A1 | | 8/2013 | Schaefer |
| 2013/0249173 A1 | | 9/2013 | Yamamoto |
| 2015/0147639 A1 | * | 5/2015 | Uchida ............. H01M 10/6556 |
| | | | 429/185 |
| 2018/0249601 A1 | | 8/2018 | Raettich et al. |

FOREIGN PATENT DOCUMENTS

| | | | | |
|---|---|---|---|---|
| DE | 10 2013 011 686 A1 | | 1/2015 | |
| DE | 10 2014 213 682 A1 | | 1/2016 | |
| DE | 102017009544 A1 | * | 4/2018 | |
| DE | 20 2018 103 437 U1 | | 8/2018 | |
| FR | 3067436 A1 | * | 12/2018 | |
| KR | 101895870 B1 | * | 9/2018 | |
| WO | WO 2010/098923 A1 | | 9/2010 | |
| WO | WO 2012/022448 A1 | | 2/2012 | |
| WO | WO-2012077491 A1 | * | 6/2012 | ............. F16J 15/024 |
| WO | WO 2015/003786 A1 | | 1/2015 | |
| WO | WO-2018000073 A1 | * | 1/2018 | ............ H01M 50/15 |

OTHER PUBLICATIONS

Jeanne, Rigid Frame and Elastomer Seal, Dec. 2018, See the Abstract. (Year: 2018).*
Li et al., A Lithium Ion Battery Extrusion Coated Gasket, Dec. 2017, See the Abstract. (Year: 2017).*
Kim, Bushing For Battery Gasket and Manufacturing Apparatus For The Same, Sep. 2018, See the Abstract. (Year: 2018).*
Yamamoto, Gasket, Jun. 2012. See the Abstract. (Year: 2012).*
Matte, Interface Sealing Component for a Battery Cover Assembly, and Related Systems and Methods, Jan. 2018, See the Abstract. (Year: 2018).*
International Search Report (PCT/ISA/210) issued in PCT Application No. PCT/EP2020/068992 dated Oct. 14, 2020 with English translation (four (4) pages).
German-language Written Opinion (PCT/ISA/237) issued in PCT Application No. PCT/EP2020/068992 dated Oct. 14, 2020 (six (6) pages).
German-language Search Report issued in German Application No. 10 2019 121 510.2 dated Apr. 24, 2020 with a partial English translation (12 pages).
Chinese-language Office Action issued in Chinese Application No. 202080042400.2 dated Feb. 10, 2023 with English translation (16 pages).

* cited by examiner

SEAL FOR A BATTERY HOUSING OF A HIGH-VOLTAGE BATTERY, METHOD, BATTERY HOUSING, HIGH-VOLTAGE BATTERY AND MOTOR VEHICLE

BACKGROUND AND SUMMARY OF THE INVENTION

The invention relates to a seal for a battery housing of a high-voltage battery of a motor vehicle. The invention also relates to a method for producing the seal, to a battery housing, to a high-voltage battery and to a motor vehicle.

Interest is directed in the present case toward rechargeable high-voltage batteries or high-voltage accumulators which can be used, for example, as traction batteries for electrically drivable motor vehicles. Such high-voltage batteries usually have a battery housing, a plurality of battery cells, inter alia, being arranged in the interior space of said battery housing. To protect these battery cells from environmental influences, for example moisture and dirt, the battery housing has to be tightly closed. A seal is therefore usually arranged between a housing lower part of the battery housing and a housing cover of the battery housing. This seal can for example be of frame-like configuration and be arranged on and fastened to a housing flange of the housing lower part before the battery housing is closed. After the battery housing has been closed by placing the housing cover onto the housing lower part, the seal prevents dirt and moisture from penetrating into the interior space of the battery housing.

In order to be able to provide particularly high ranges for the electrically drivable motor vehicle, the high-voltage batteries are equipped with a large number of battery cells, as a result of which the battery housing has large external dimensions. If the frame-like seal is to be manufactured from one piece, it is thus usually necessary to provide a correspondingly large production tool to produce the seal. This can lead to high production costs for the seal. If such a production tool cannot be provided, the seal has to be manufactured from several individual parts which are assembled in a frame-like manner before or during the arrangement on the housing flange. However, this can result in undesired leaks in the region of transitions between the individual parts of the seal.

It is the object of the present invention to provide a cost-effective and reliable seal for a battery housing of a high-voltage battery.

This object is achieved by a seal, a method, a battery housing, a high-voltage battery and a motor vehicle having the features according to the claimed invention.

A seal according to an embodiment of the invention for a battery housing of a high-voltage battery of a motor vehicle can be transferred from a production position, which is provided for a production tool of the seal, to an installation position, which is provided for the battery housing. In the installation position, the seal has a greater external dimension than in the production position. The seal has a seal body for arrangement between a housing flange of a housing lower part of the battery housing and a housing cover of the battery housing. The seal also comprises positioning elements and fixing elements for positioning and fixing the seal body on the housing flange.

The seal body is configured in the form of a one-part, frame-like seal ring composed of an elastic plastic. At least one seal body portion is configured to be of reversibly variable length and has fold regions for this purpose. The at least one seal body portion provides, in the folded state of the fold regions, the production position of the seal and, in the unfolded state of the fold regions, the installation position of the seal. The seal body also has positioning regions and fixing regions. The positioning regions and fixing regions, in which the positioning elements and fixing elements are arranged, are formed away from the fold regions in the seal body and have a greater width than the fold regions.

The invention also relates to a method for producing a seal according to the invention in a production tool. To produce the one-piece seal body, the fold regions, the positioning regions and the fixing regions are formed by injection molding an elastic plastic in a frame-like manner in different widths. The fold regions of at least one seal body portion are produced in the folded state for the purpose of providing the production position of the seal. During and/or after production of the seal body, the positioning elements and the fixing elements are arranged in the positioning regions and the fixing regions on the seal body.

The invention also includes a battery housing for a high-voltage battery, having a housing lower part, a housing cover and a seal according to the invention, which is arranged between a housing flange of the housing lower part and the housing cover. In particular, a groove is formed in the housing flange, the seal being arranged in said groove.

The housing lower part and the housing cover enclose an interior space in which a plurality of battery cells of the high-voltage battery can be arranged. The housing cover is in particular of plate-like configuration. The housing lower part is formed in particular by a plate-like housing base and housing lateral walls which protrude from the housing base upward in the direction of the housing cover. The housing flange is formed, for example, by an outwardly projecting, collar-like peripheral portion of the housing lateral walls. A shape of the battery housing, by way of which a shape of the housing flange is prescribed, can be of any configuration. For example, the battery housing may be of substantially cuboidal or box-like configuration with a substantially rectangular housing flange. A substantially cuboidal battery housing is also to be understood to mean, for example, a cuboidal battery housing having indentations or bulges. In the case of such a battery housing, the housing flange also has indentations or bulges.

In order to seal off the interior space of the battery housing in relation to the surroundings of the battery housing, the seal is arranged between the housing lower part and the housing cover. The seal can be transferred between two states or positions, namely the production position and the installation position. The seal has the seal body which is configured in the form of the frame-like seal ring. A frame-like seal ring is understood to mean, in particular, a seal body with frame edges and frame corners, which form a closed shape. The shape and the external dimension of the seal ring in the installation position correspond to a shape and to dimensions of the housing flange. In the case of a rectangular housing flange, the frame-like seal ring is thus also of rectangular configuration. If, for example, indentations are provided in the housing flange, then the frame-like seal ring also has indentations in the installation position. In this case, the seal body is produced in one piece or in one part from the elastically deformable plastic, in particular an elastomer, by injection molding. Due to the closed shape and the one-piece form of the seal ring, on the seal body there are in particular no joining points or connecting points at which sealing problems can occur in the installed state of the seal.

In order to be able to arrange the seal body in a defined shape with a defined position on the housing flange, the seal has the fixing elements and the positioning elements, which are arranged in the positioning regions and fixing regions of the seal body. In this case, the fixing elements and/or the positioning elements may be configured at least partially in one part with the seal body. The fixing elements and/or the positioning elements may also be configured at least in some instances in the form of elements that are separate from the seal body and be fastened to the seal body. The positioning elements and/or fixing elements may be manufactured at least partially from the same material as the seal body or comprise a material different to the seal body. Here, a fixing element and a positioning element may be configured in the form of elements that are separate from one another. In this case, the positioning region and the fixing region are also configured as separate regions. As an alternative to this, a fixing element and a positioning element may be combined to form a multifunctional element. In this case, the positioning region and the fixing region are also combined to form one region. The multifunctional element is thus used to position and fix the seal body on the housing flange.

The fold regions are formed in the seal body away from the positioning regions and the fixing regions. The fold regions are formed by virtue of the fact that a width of the seal body is reduced in comparison with the width of the seal body in the positioning regions and fixing regions. During the production of the seal body, the plastic is shaped in such a way that the at least one seal body portion of reversibly variable length has a width that varies along the length thereof. The seal body is thus tapered or constricted in certain regions to form the fold regions. By folding the fold regions, it is possible to shorten the length of the associated seal body portion. By unfolding the fold regions, it is possible to increase the length of the associated seal body portion again.

In this case, the fold regions or hinge regions are arranged in particular in those seal body portions which form frame edges, but not in the frame corners. Sealing problems can occur in particular at corners of the battery housing, for which reason the seal here should be of particularly reliable configuration. The frame corners of the seal body, which are configured to seal the battery housing in the region of the corners, are therefore formed without fold regions. Preferably, the frame corners are even reinforced and formed with a higher stiffness than the frame edges. The frame corners can, however, have positioning regions and/or fixing regions.

To provide the production position of the seal, the fold regions are produced in the folded state. In the folded state of the fold regions, the latter form in each case an arcuate profile, for example a bend or a kink, in the seal body portion. In this production position, the seal body portion having the fold regions has a first length, as a result of which the seal body has a first external dimension and thus a first space requirement. To provide the installation position of the seal, the fold regions are in turn provided in the unfolded state and a rectilinear profile is in turn formed in the seal body portion. In this installation position, the seal body portion having the fold regions has a second length which is greater than the first length, as a result of which the seal body has a second external dimension which is greater than the first external dimension, and also a second space requirement which is greater than the first space requirement.

The invention is based on the finding that the dimensions of the housing flange, and thus the external dimension of the seal, can be greater than the space available in the production tool. The seal body is therefore manufactured in the production tool in the space-saving production position. In order to arrange the seal on the housing flange, for example in a groove in the housing flange, the seal body is in turn stretched and the installation position provided. Such a foldable, one-piece seal can be produced in a particularly space-saving and thus cost-effective manner and, moreover, permits reliable sealing of the battery housing.

In particular, the seal body has, in seal body portions forming at least two opposite frame edges of the seal body, in each case at least four fold regions, by way of which in each case at least one inwardly projecting tab can be folded in the frame edges in order to reduce the lengths thereof. As a result of the four fold regions per seal body portion, a bending angle or kink angle of the seal body portion in the fold regions is at least 90°. This is particularly advantageous since smaller kink angles would result in more pronounced loading of a material of the seal body in the fold regions and could result in cracks or fractures in the material in the fold regions.

The seal is preferably configured in the form of a profile seal. The seal body has at least two sealing lips which run along at least one periphery of the seal body. In this case, the sealing lips are configured so as to be oriented in a height direction oriented perpendicularly with respect to the width direction of the seal body. In the state when the seal is arranged on the housing flange, the at least two sealing lips protrude upward in the direction of the housing cover and/or downward in the direction of the housing flange. It may for example be the case that the two sealing lips run along one periphery of the seal body, for example an outer periphery of the seal body, wherein one sealing lip protrudes upward and one sealing lip protrudes downward. In this case, the positioning elements and fixing elements are arranged next to the two sealing lips on the seal body. It may also be the case that the sealing lips are arranged spaced apart from one another on two opposite peripheries, an outer periphery and an inner periphery, which lies opposite the outer periphery, of the seal body. The sealing lips may in this case be oriented in the same direction or in opposite directions along the height direction. In this case, the positioning elements and the fixing elements are arranged between the sealing lips on the seal body.

The sealing lips represent barriers to moisture and dirt and prevent moisture and dirt from penetrating into the interior space of the battery housing in a particularly reliable manner. The seal body may also have a further sealing lip which is arranged, for example, between the sealing lips running along the peripheries. For example, the sealing lips running along the peripheries may be oriented upward in the direction of the housing cover, while the sealing lip running between the peripheries is oriented downward in the direction of the housing flange, or vice versa.

It has proven to be advantageous for the fold regions and/or the positioning regions and/or the fixing regions to be configured so as to be able to be overstretched in order to enlarge the external dimension of the seal in the installation position for the arrangement in a groove of the housing flange. In the non-overstretched state of the respective region or regions, the seal in the installation position has a smaller external dimension than dimensions of the groove of the housing flange. For arrangement in the groove, at least one of the regions is overstretched to further lengthen the seal body portions and to adapt the external dimension to the dimensions of the groove. The seal is then arranged in the groove. As a result of the overstretching, the seal is retained in the groove, and retains its shape, even in the unfixed state by the fixing elements and positioning elements, with the result that it is advantageously possible to reduce the number of positioning elements and fixing elements.

It may be provided that the positioning regions and the fixing regions are arranged in first strip-like portions of the seal body and the fold regions are formed by second strip-like portions of the seal body, wherein the first strip-like portions have a first width and the second strip-like portions have a second width which is smaller than the first width. The frame edges of the seal ring are thus formed by a plurality of strip-like portions. For example, at least two opposite frame edges of the frame-like seal ring may be formed from the first strip-like portions and the second strip-like portions. Each first strip-like portion can have at least one positioning region and/or at least one fixing region. The second strip-like portions form the fold regions. In this case, the first strip-like portions have the first width and the second strip-like portions have the second width which is smaller than the first width.

In a development of the invention, the positioning elements are configured at least in some instances in the form of passage openings in the seal body for the purpose of guiding through fastening elements which can be used to fasten the housing cover to the housing flange. The positioning regions may be configured for example in the form of eyes, which surround the passage openings, by increasing the width of the seal body in the regions adjoining the passage openings in relation to the fold regions. The positioning regions may also be subregions of a first strip-like portion in which the passage openings are arranged.

The housing cover and the housing flange have fastening regions, for example screw holes, which can be connected to the fastening elements, for example screws. When the seal is being arranged on the housing flange, the passage openings are arranged so as to overlap the fastening regions of the housing flange. The passage openings therefore function as spacers and are used to correctly position the seal on the housing flange. For example, bushings for receiving the fastening elements may be arranged in the fastening regions of the housing flange. When the seal is being positioned on the housing flange, the passage openings of the seal body can be put over the bushings. The bushings can be formed, for example, from aluminum and ensure controlled arrangement or pressing of the seal.

It may also be provided that the seal has bushings, for example composed of aluminum, which are arranged in the passage openings of the seal body and which are mechanically connected to the seal body. A passage opening and the bushing arranged therein thus forms a positioning element. For example, the bushings may be connected to the seal body directly in the production tool. To this end, the bushings may be overmolded during the injection molding of the seal body and thus be fastened to the seal body. These bushings then make it possible for the fastening elements to be guided through in the state when the seal is arranged on the housing flange.

It may likewise be provided that the positioning elements are configured at least in some instances in the form of pin elements, which are arranged on a lower side of the seal body, said lower side being able to abut against the housing flange, and which can be arranged in positioning openings in the housing flange. The housing flange thus has positioning openings into which the pin elements can be introduced for the purpose of correct positioning. The pin elements may be formed, for example, in one part with the seal body.

In a further embodiment of the invention, the fixing elements are configured at least in some instances in the form of plug elements, which are arranged on a lower side of the seal body, said lower side being able to abut against the housing flange, and which can be pressed into fixing openings in the housing flange for the purpose of fixing the seal body on the housing flange. The housing flange thus also has fixing openings, for example in addition to the positioning openings. The plug elements may be formed in one part with the seal body or separately from the seal body. The plug elements can be pressed for example under pressure from an upper side of the housing flange facing the housing cover into the fixing openings. As an alternative to this, the plug elements can be pulled from a lower side of the housing flange facing away from the housing cover into the fixing openings. The pressing of the plug elements into the fixing openings provides a press fit between the seal body and the housing flange, it being possible to retain the seal in a defined position on the housing flange in a particularly reliable manner by way of said press fit.

Particularly preferably, the plug elements are of hollow configuration for the purpose of introducing an assembly aid into the plug elements and for the purpose of pressing the plug elements into the fixing openings. The assembly aid may for example be a pin, which is introduced into the hollow plug element and by way of which the plug element can be pressed from above into the fixing opening of the housing flange. The seal can thus be fixed on the housing flange in a particularly simple and rapid manner.

The invention also includes a high-voltage battery for an electrically drivable motor vehicle, having a battery housing according to the invention and at least one battery cell which is arranged in an interior space of the battery housing. A motor vehicle according to the invention comprises a high-voltage battery according to the invention. The motor vehicle is configured, in particular, as an electric or hybrid vehicle and has the high-voltage battery as a traction battery.

The embodiments, and the advantages thereof, which are presented in relation to the seal according to the invention apply correspondingly to the method according to the invention, to the battery housing according to the invention, to the high-voltage battery according to the invention and to the motor vehicle according to the invention.

Further features of the invention will emerge from the claims, from the figures and from the description of the figures. The features and combinations of features mentioned above in the description, and also the features and combination of features mentioned below in the description of the figures and/or shown only in the figures, may be used not only in the respectively specified combination but also in other combinations or individually.

The invention will now be explained in more detail on the basis of a preferred exemplary embodiment and with reference to the drawings.

DETAILED DESCRIPTION OF THE DRAWINGS

In the figures, identical and functionally identical elements are denoted by the same reference designations.

Figure 1:
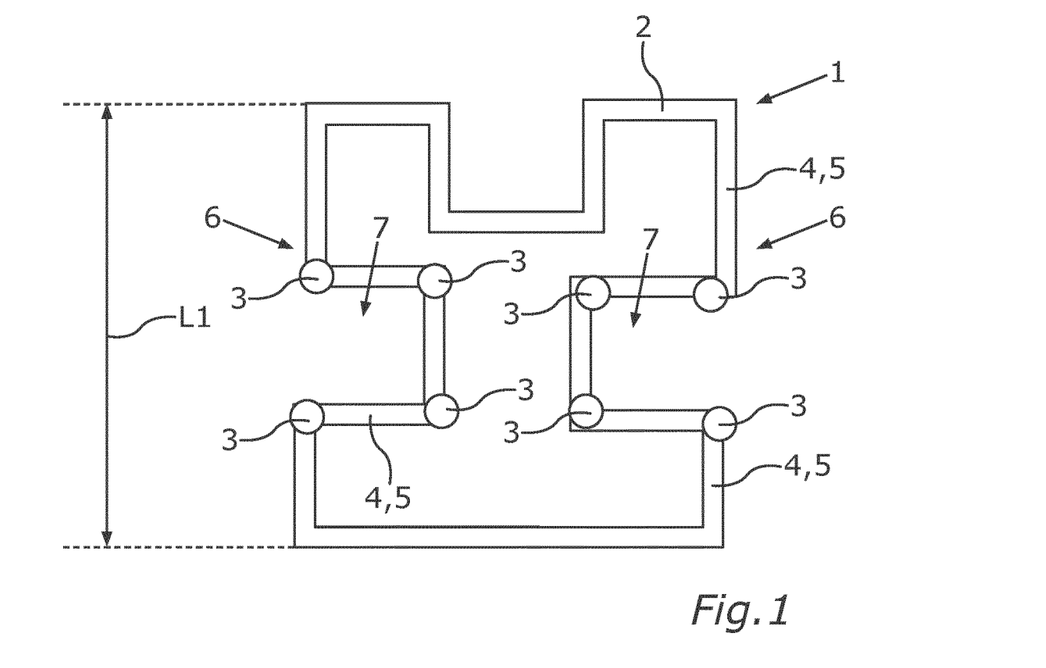
FIG. 1 shows a schematic illustration of a seal for a battery housing in a production position.
Figure 2:
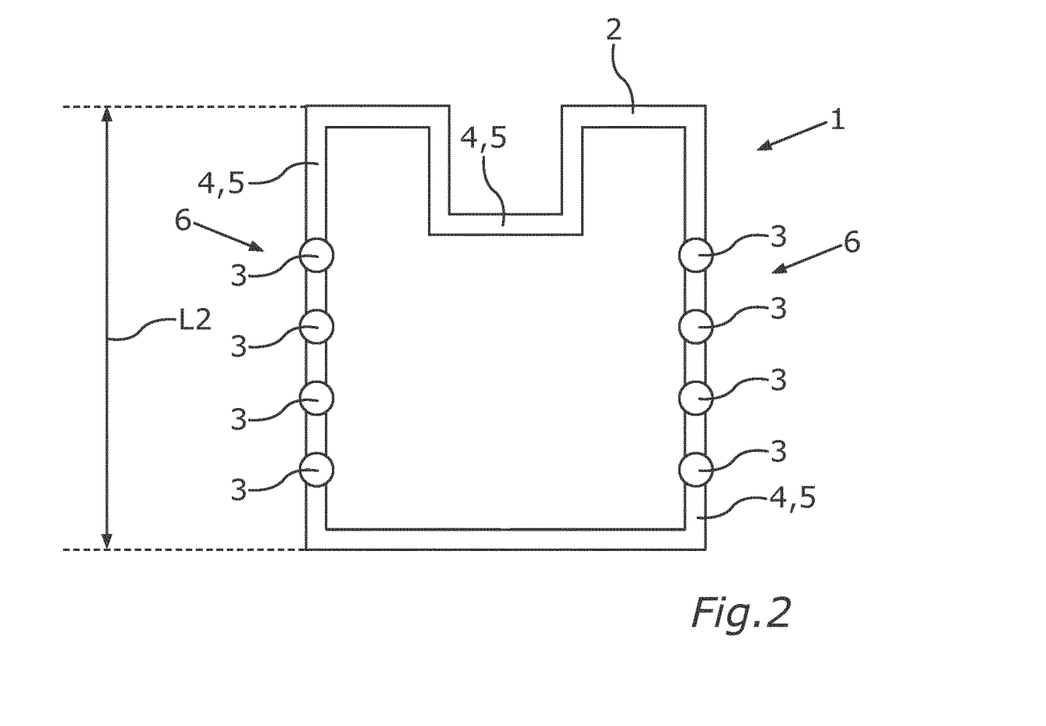
FIG. 2 shows a schematic illustration of a seal for a battery housing in an installation position.

FIG. 1 and FIG. 2 show a simplified illustration of a seal 1 for a battery housing (not shown here) of a high-voltage battery in different positions. The seal 1 is arranged in this case between a housing flange of a housing lower part of the battery housing and a housing cover of the battery housing. FIG. 1 shows the seal 1 in a production position, in which the seal 1 is produced in a production tool, and FIG. 2 shows the seal 1 in an installation position, in which the seal 1 is arranged on the housing flange. In the production position of the seal 1, the latter has a first external dimension, and in the installation position of the seal 1, the latter has a second external dimension which is greater than the first external dimension.

The seal 1 has a seal body 2 composed of an elastic plastic, in particular an elastomer. The seal body 2 is formed in one piece and in a frame-like manner and has, in the installation position as per FIG. 2, a shape which corresponds to a shape of the housing flange, here a rectangular shape with an indentation. The seal body 2 has fold regions 3, positioning regions 4 and fixing regions 5. The fold regions 3 are shown in a folded state in FIG. 1 and in an unfolded state in FIG. 2. The fold regions 3 are formed here in seal body portions 6 in the form of two opposite frame edges of the frame-like seal body 2. As a result of the fold regions 3, the associated seal body portion 6 is configured to be of reversibly variable length. Here, each of the two opposite seal body portions 6 has four fold regions 3, by way of which in the production position an inwardly projecting tab 7 can be formed in the seal body portion 6. In the production position, the seal body portions 6 having the fold regions 3 have a first length L1 on account of the inwardly projecting tab 7. In the installation position, the seal body portions 6 having the fold regions 3 have a second length L2 which is greater than the first length L1. The different lengths L1, L2 thus make it possible to provide different, position-specific external dimensions of the seal body 2 and thus of the seal 1.

Figure 3:
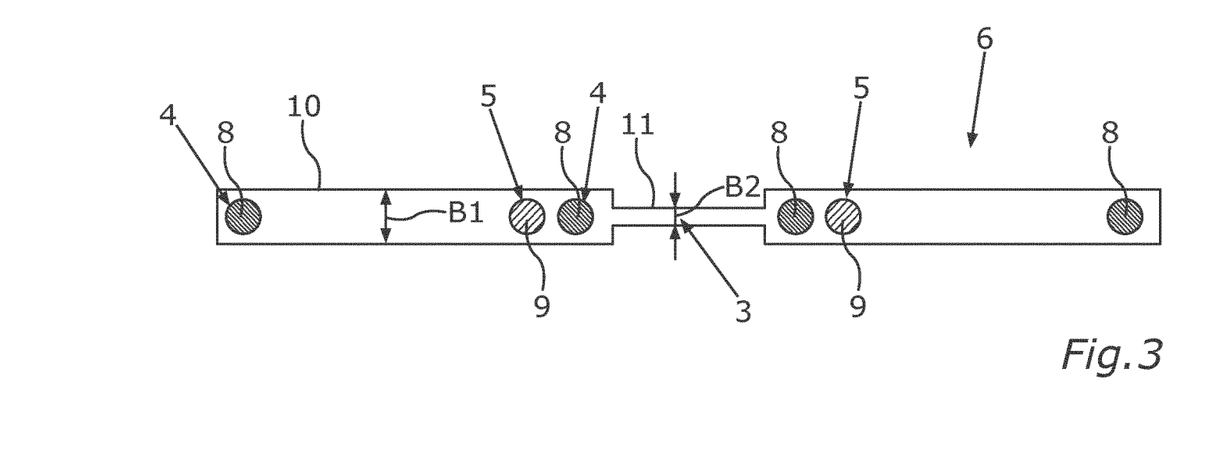
FIG. 3 shows a schematic illustration of fold regions, fixing regions and positioning regions of a first embodiment of the seal.
Figure 4:
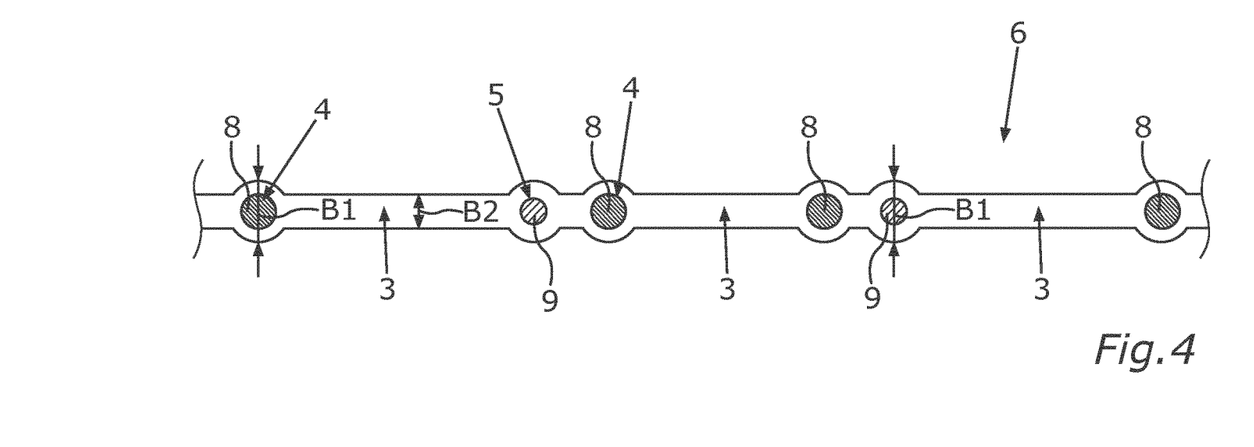
FIG. 4 shows a schematic illustration of fold regions, fixing regions and positioning regions of a second embodiment of the seal.

Positioning elements 8 and fixing elements 9 can be arranged in the positioning regions 4 and the fixing regions 5, as indicated in FIG. 3 and FIG. 4. At least in the region of the positioning regions 4 and fixing regions 5, in which the positioning elements 8 and fixing elements 9 are arranged, the seal body 2 has a first width B1 which is increased in relation to a second width B2 of the fold regions 3. FIG. 3 shows that the seal body portion 6 with the fold regions 3 is formed from first strip-like portions 10 and second strip-like portions 11, wherein the positioning regions 4 and fixing regions 5 are arranged in the first strip-like portions 10 and the fold regions 3 are arranged in the second strip-like portions 11. The first strip-like portions 10 have the first width B1 and the second strip-like portions 11 have the second width B2. FIG. 4 shows that the first width B1 is configured only in the positioning regions 4 and fixing regions 5.

Figure 5:
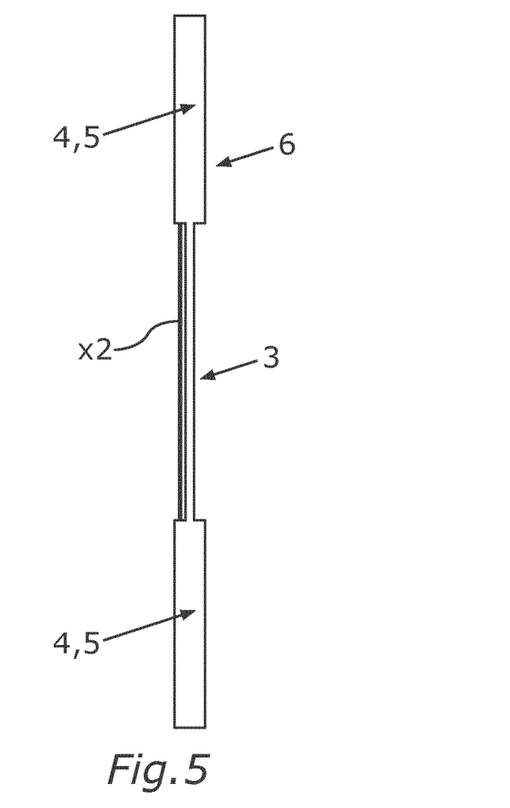
FIG. 5 shows a schematic illustration of a fold region in a folded state and an unfolded state.
Figure 6:
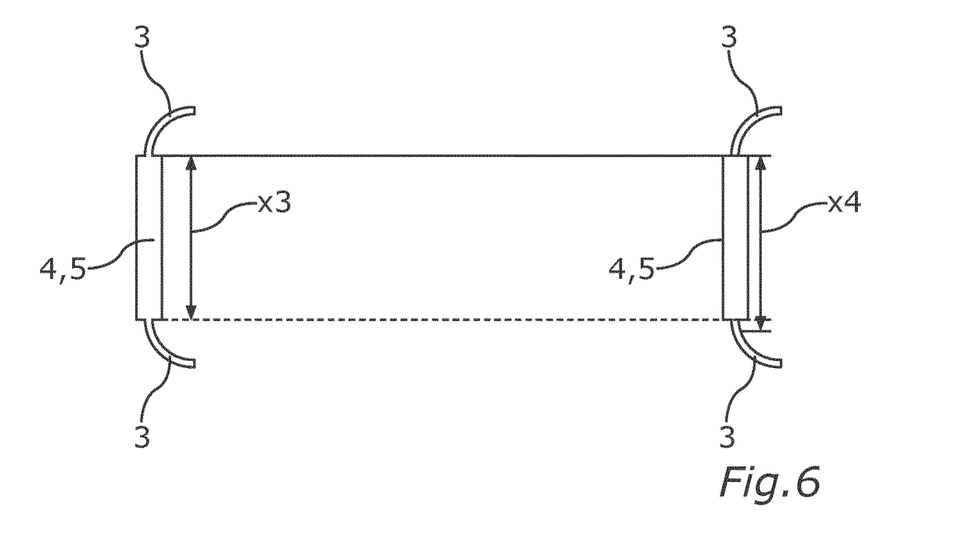
FIG. 6 shows a schematic illustration of a positioning region and/or a fixing region in a non-overstretched state and an overstretched state.

In FIG. 5, the fold region 3 of the seal body portion 6 as per FIG. 3 is shown in a folded state on the left-hand side and in an unfolded state on the right-hand side. The fold region 3 is configured so as to be able to be overstretched and has, in the folded state, a first length x1 and, in the unfolded state, a second length x2 which is greater than the first length x1. FIG. 6 shows that the fixing region 5 and/or the positioning region 4 can also be configured so as to be able to be overstretched. In this case, the fixing region 5 and/or positioning region 4 has, in the non-overstretched state, a third length x3 and, in the overstretched state, a fourth length x4 which is greater than the third length x3. The capacity for overstretching of the fold regions 3 and/or positioning regions 4 and/or fixing regions 5 makes it possible to ensure a defined position of the seal 1 in the installation space, for example in a groove of the housing flange.

Figure 7:
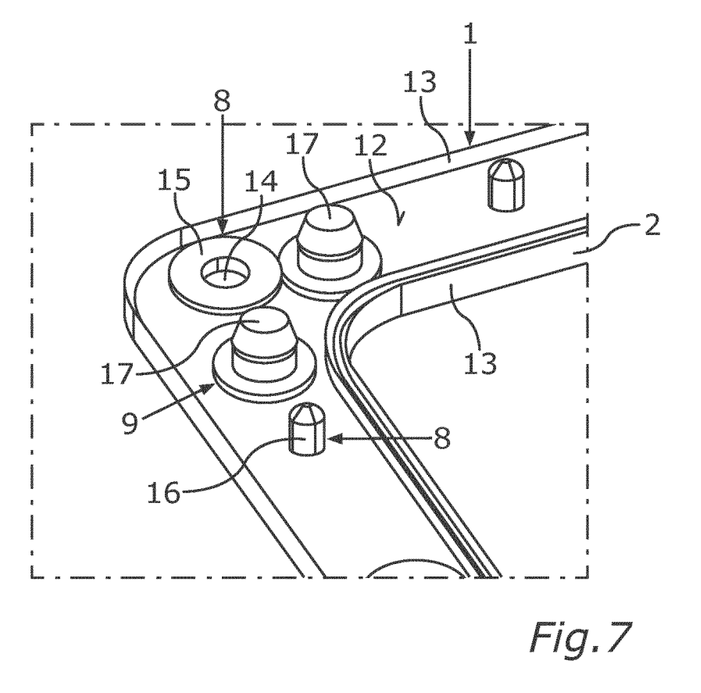
FIG. 7 shows a schematic illustration of the seal in the region of a frame edge.

FIG. 7 shows the seal 1 in the region of a frame edge of the seal body 2. Here, a lower side 12 of the seal body is shown, on which the positioning elements 8 and fixing elements 9 are arranged. The seal body 2 has two sealing lips 13 which are configured here on two opposite peripheries of the seal body 2. The positioning elements 8 and fixing elements 9 are arranged between the sealing lips 13. It may also be the case that both sealing lips 13 are arranged on one periphery of the seal body 2, wherein one sealing lip 13 protrudes upward and one sealing lip 13 protrudes downward.

The positioning elements 8 and/or the fixing elements 9 may be configured at least partially in one part with the seal body 2. The positioning elements 8 are formed here in some instances by a passage opening 14 in the seal body 2 and a bushing 15 arranged in the passage opening 14. This passage opening 14 makes it possible to guide through a fastening element, for example a screw, for the purpose of fastening the housing cover to the housing flange. The passage opening 14 with the bushing 15 is used in this case as a spacer and ensures a defined position of the seal 1 on the housing flange. Here, the seal 1 also additionally has positioning elements 4 in the form of pin elements 16, which can be plugged into positioning openings on the housing flange for the purpose of positioning the seal 1.

Figure 8:
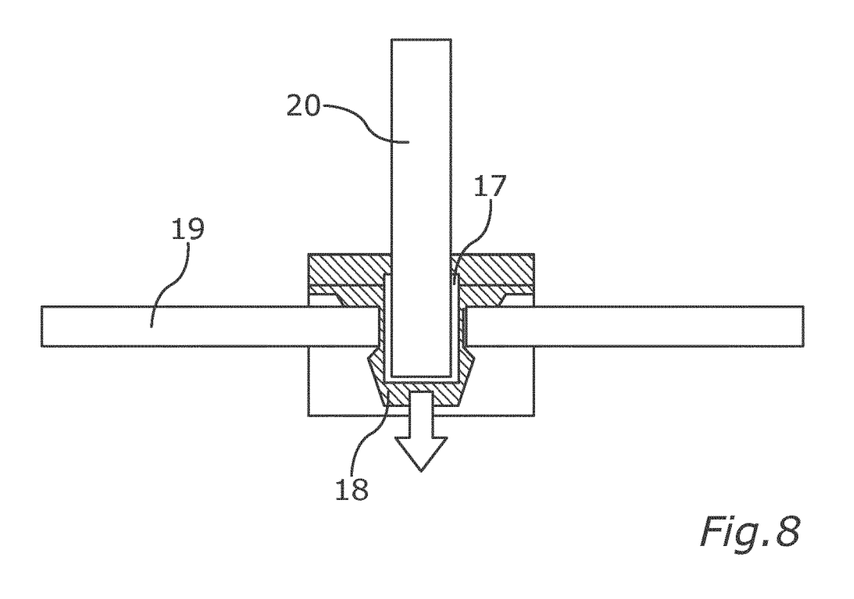
FIG. 8 shows a schematic illustration of the seal during assembly on a housing flange of the battery housing.

The fixing elements 5 are formed here by plug elements 17. The plug elements 17 can be pressed into fixing openings 18 in the housing flange 19 (see FIG. 8). The plug elements 17 are in particular configured to be hollow on the inside, such that, as shown in FIG. 8, an assembly aid 20 can be introduced into the plug elements 17. By way of the assembly aid 20, the plug elements 17 can be introduced and pressed into the fixing openings 18 in a particularly simple manner. The plug elements 17 are formed here from an elastic material, for example in one part with the seal body 2. As a result, they are compressed during the pressing into the fixing openings 18 and thus retained in the fixing openings 18. It is also possible for the fixing elements 5 to be connected to the housing flange in a form-fitting manner and to generate an undercut. For example, the fixing elements 5 may be configured to this end in the form of clip elements and be clipped into the fixing openings 18.

What is claimed is:

1. A seal for a battery housing of a high-voltage battery of a motor vehicle, wherein the seal is transferrable from a production position, which is provided for a production tool, to an installation position, which is provided for the battery housing and in which the seal has a greater external dimension than in the production position, the seal comprising:
a seal body for arrangement between a housing flange of a housing lower part of the battery housing and a housing cover of the battery housing, and
positioning elements and fixing elements for positioning and fixing the seal body on the housing flange, wherein:

the seal body is configured in a form of a one-part, closed seal ring composed of an elastic plastic and has at least one seal body portion of reversibly variable length with fold regions, a shape and a dimension of the closed seal ring in the installation position correspond to a shape and a dimension of the housing flange, the at least one seal body portion provides, in a folded state of the fold regions, the production position of the seal and, in an unfolded state of the fold regions, the installation position of the seal, and positioning regions and fixing regions, which are formed away from the fold regions in the seal body and in which the positioning elements and the fixing elements are arranged, are configured to have a greater width than the fold regions.

2. The seal according to claim 1, wherein:
at least one of the fold regions, the positioning regions, or the fixing regions are configured to be able to be overstretched in order to enlarge an external dimension of the seal in the installation position for arrangement on the housing flange.

3. The seal according to claim 1, wherein:
the seal body has, in each seal body portion of a plurality of seal body portions forming at least two opposite frame edges of the seal body, at least four fold regions, by way of which in each case at least one inwardly projecting tab is foldable in the frame edges in order to reduce the lengths of the seal body portions.

4. The seal according to claim 1, wherein:
at least some of the positioning elements are configured in a form of passage openings in the positioning regions of the seal body for guiding through fastening elements which can be used to fasten the housing cover to the housing flange.

5. The seal according to claim 4, further comprising bushings which are arranged in the passage openings and which are mechanically connected to the seal body.

6. The seal according to claim 1, wherein:
at least some of the positioning elements are configured in a form of pin elements, which are arranged on a lower side of the seal body,
the lower side is able to abut against the housing flange, and
the pin elements are arrangeable in positioning openings in the housing flange.

7. The seal according to claim 1, wherein:
at least some of the fixing elements are configured in a form of plug elements, which are arranged on a lower side of the seal body,
the lower side is able to abut against the housing flange, and the plug elements are pressable into fixing openings in the housing flange for fixing the seal body on the housing flange.

8. The seal according to claim 7, wherein:
the plug elements are of hollow configuration for introducing an assembly aid into the plug elements and for pressing the plug elements into the fixing openings in the housing flange by way of the assembly aid.

9. The seal according to claim 1, wherein:
the positioning regions and the fixing regions are arranged in first strip-shaped portions of the seal body,
the fold regions are formed by second strip-shaped portions of the seal body,
the first strip-shaped portions have a first width, and
the second strip-shaped portions have a second width which is smaller than the first width.

10. The seal according to claim 1, wherein:
the seal is configured in the form of a profile seal, and
the seal body has at least two sealing lips which run along at least one periphery of the seal body.

11. A method for producing the seal according to claim 1 in a production tool, the method comprising:
to produce the seal body, forming the fold regions, the positioning regions and the fixing regions by injection molding an elastic plastic in at least two different widths,
producing the fold regions of the at least one seal body portion in the folded state for providing the production position of the seal; and
at least one of during or after production of the seal body, arranging the positioning elements and the fixing elements in the positioning regions and the fixing regions on the seal body.

12. A battery housing for a high-voltage battery of a motor vehicle, the battery housing comprising:
the housing lower part,
the housing cover, and
the seal according to claim 1,
wherein the seal is arranged between the housing cover and the housing flange of the housing lower part.

13. The battery housing according to claim 12, wherein a groove is arranged in the housing flange, and
the seal is arranged in the groove.

14. A high-voltage battery for an electrically drivable motor vehicle, the high-voltage battery comprising:
the battery housing according to claim 12, and
at least one battery cell which is arranged in an interior space of the battery housing.

15. A motor vehicle comprising the high-voltage battery according to claim 14.

* * * * *